United States Patent
Catchpole

(10) Patent No.: US 8,747,806 B2
(45) Date of Patent: Jun. 10, 2014

(54) HYDROGEN PROCESS

(75) Inventor: Stephen John Catchpole, Middlesbrough (GB)

(73) Assignee: Johnson Matthey PLC, London (GB)

( * ) Notice: Subject to any disclaimer, the term of this patent is extended or adjusted under 35 U.S.C. 154(b) by 360 days.

(21) Appl. No.: 13/146,848

(22) PCT Filed: Jan. 14, 2010

(86) PCT No.: PCT/GB2010/050043
§ 371 (c)(1),
(2), (4) Date: Oct. 11, 2011

(87) PCT Pub. No.: WO2010/086635
PCT Pub. Date: Aug. 5, 2010

(65) Prior Publication Data
US 2012/0039794 A1    Feb. 16, 2012

(30) Foreign Application Priority Data
Jan. 30, 2009    (GB) .................................. 0901472.1

(51) Int. Cl.
*C01B 31/20*    (2006.01)
*C01B 3/26*    (2006.01)

(52) U.S. Cl.
USPC ......... 423/652; 423/437.1; 423/653; 423/654

(58) Field of Classification Search
USPC .............................. 423/437.1, 652, 653, 654
See application file for complete search history.

(56) References Cited

U.S. PATENT DOCUMENTS

| | | |
|---|---|---|
| 4,910,228 A | 3/1990 | Lywood |
| 6,033,634 A | 3/2000 | Koga |
| 6,090,312 A * | 7/2000 | Ziaka et al. .................... 252/373 |
| 7,695,708 B2 * | 4/2010 | Peng et al. ..................... 423/652 |
| 8,460,630 B2 * | 6/2013 | Niitsuma et al. ........... 423/437.1 |

(Continued)

FOREIGN PATENT DOCUMENTS

| | | |
|---|---|---|
| EP | 0171786 | 2/1986 |
| GB | 1578270 | 11/1980 |

(Continued)

OTHER PUBLICATIONS

International Search Report for PCT/GB2010/050043 dated Apr. 9, 2010.

Jian Zou et al., "CO2-Selective Water Gas Shift Membrane Reactor for Fuel Cell Hydrogen Processing," Ind. Eng. Chei. Res, vol. 46, No. 8, 2007, pp. 2272-2279, XP002571135, Ohio.

(Continued)

*Primary Examiner* — Wayne Langel
(74) *Attorney, Agent, or Firm* — RatnerPrestia

(57) ABSTRACT

A process for producing hydrogen includes: passing a hydrocarbon feed though purification sorbent(s), combining steam with the purified hydrocarbon and passing the hydrocarbon/steam mixture adiabatically through a bed of steam reforming catalyst, passing the pre-reformed gas mixture through a fired steam reformer to generate a crude synthesis gas mixture, passing the crude synthesis gas mixture through one or more beds of water-gas shift catalyst to generate a shifted synthesis gas mixture, passing the shifted synthesis gas mixture to a membrane shift reactor containing a bed of water-gas shift catalyst and a $CO_2$-selective membrane, cooling the hydrogen-enriched gas mixture to below the dew point and separating off the condensate, passing the de-watered hydrogen-enriched gas mixture to $CO_2$ separation in pressure-swing absorption apparatus, and recycling at least a portion of the purge gas stream as fuel to the fired steam reformer or to the hydrocarbon feed or purified hydrocarbon feed streams.

18 Claims, 3 Drawing Sheets

(56) References Cited

U.S. PATENT DOCUMENTS

| | | | |
|---|---|---|---|
| 2005/0201929 A1* | 9/2005 | Hershkowitz et al. | 423/652 |
| 2006/0230680 A1 | 10/2006 | Rostrup-Nielsen | |
| 2007/0274904 A1* | 11/2007 | Popham et al. | 423/652 |
| 2008/0311014 A1 | 12/2008 | Nakamura | |
| 2009/0230359 A1* | 9/2009 | Guvelioglu et al. | 252/373 |
| 2010/0129284 A1* | 5/2010 | Niitsuma et al. | 423/437.1 |
| 2010/0172827 A1* | 7/2010 | Woods et al. | 423/652 |
| 2010/0260657 A1* | 10/2010 | Niitsuma et al. | 423/437.1 |
| 2012/0141368 A1* | 6/2012 | Vakil et al. | 423/652 |

FOREIGN PATENT DOCUMENTS

| | | |
|---|---|---|
| WO | 9705947 | 2/1997 |
| WO | 9906138 | 2/1999 |
| WO | 2006027175 | 3/2006 |
| WO | 2006097703 | 9/2006 |

OTHER PUBLICATIONS

Huang et al., Journal of Membrane Science, Elsevier Scientific Publ. Company. Amsterdam, NL. vol. 261, No. 1-2, Sep. 15, 2005, pp. 67-75, XP005043837 ISSN: 0376-7388.

* cited by examiner

US 8,747,806 B2

HYDROGEN PROCESS

CROSS REFERENCE TO RELATED APPLICATIONS

This application is the U.S. national phase application of PCT International Phase Application No. PCT/GB2010/050043, filed Jan. 14, 2010, which claims priority to Great Britain Patent application No. GB0901472.1, filed Jan. 30, 2009, the contents of such applications being incorporated by reference herein in their entireties for all purposes.

FIELD OF THE INVENTION

This invention relates to a process for producing hydrogen, in particular to producing hydrogen on an industrial scale for refineries.

BACKGROUND OF THE INVENTION

Hydrogen is increasingly important in processing hydrocarbons and the demand for refinery hydrogen has increased in recent years. By far the most practical way to produce hydrogen on a large scale (e.g. suitable for feed to a hydrotreater or hydrocracker) is the steam reforming reaction sequence where steam and a hydrocarbon are reacted. In the case of a natural gas feed, two molecules of hydrogen are released for every molecule of methane and one molecule for each molecule of steam $CH_4 + H_2O \rightarrow 3H_2 + CO$ (steam reforming)
$CO + H_2O \rightarrow H_2 + CO_2$ (water-gas shift)
$CH_4 + 2H_2O \rightarrow 4H2 + CO_2$ (overall)

This reaction scheme points, however to one obvious dilemma—the production of carbon dioxide, which in mass terms is 2.51 times more than the hydrogen product being produced. Furthermore, missing from this scheme is the highly endothermic nature of the steam reforming reaction (+206 kJ/mol) that despite the fact it is catalysed by a base-metal catalyst (usually nickel on a ceramic carrier) requires a significant input of heat and high temperatures generally in excess of 800° C. This is generally achieved using a large fired heater with a multitude of process tubes containing the catalyst. The fuel burnt in the steam reformer also represents another source of carbon dioxide.

Processes for generating hydrogen on an industrial scale are known. Known processes typically comprise steam reforming a hydrocarbon such as naphtha or natural gas that has been purified to remove sulphur and/or chloride compounds, subjecting the resulting crude synthesis gas comprising hydrogen, carbon oxides and steam to a high temperature water gas shift step to increase the hydrogen content, cooling the shifted gas and removing the condensate and then separating the carbon dioxide from the de-watered shifted gas mixture to generate the hydrogen.

A modern-day hydrogen plant is not as efficient as the equations above suggest. Only approximately 90% of the hydrogen ends-up in the product stream with much of the remainder being burnt as fuel. Though the unconverted methane is also burnt, it is wasteful as natural gas is a more expensive reformer "fuel" than say a typical refinery fuel. Better would be to have more of the methane converted to hydrogen product and burn more refinery fuel instead. Finally, the reduction in carbon dioxide released to the atmosphere without compromising the cost of hydrogen production needs consideration Pre-reforming the hydrocarbon upstream of the steam reformer by passing the purified hydrocarbon and steam adiabatically through a bed of steam reforming catalyst offers some advantages, but the process efficiency may be improved further.

SUMMARY OF THE INVENTION

Accordingly, the invention provides a process for producing hydrogen comprising the steps of:
(i) passing a hydrocarbon feed though one or more purification sorbents to generate a purified hydrocarbon stream,
(ii) combining steam with the purified hydrocarbon and passing the hydrocarbon/steam mixture adiabatically through a bed of steam reforming catalyst disposed in a pre-reformer vessel to generate a pre-reformed gas mixture,
(iii) passing the pre-reformed gas mixture through externally-heated catalyst filled tubes in a fired steam reformer to generate a crude synthesis gas mixture comprising hydrogen, carbon monoxide, carbon dioxide and steam,
(iv) passing the crude synthesis gas mixture through one or more beds of water-gas shift catalyst in one or more shift vessels to generate a shifted synthesis gas mixture,
(v) passing the shifted synthesis gas mixture to a membrane shift reactor containing a bed of water-gas shift catalyst and a $CO_2$-selective membrane, in which the shifted synthesis gas mixture is subjected to the water-gas shift reaction over the water-gas shift catalyst, and carbon dioxide is separated from the resulting shifted gas mixture by the membrane, thereby generating a hydrogen-enriched gas mixture,
(vi) cooling the hydrogen-enriched gas mixture to below the dew point and separating off the condensate to generate a de-watered hydrogen-enriched gas mixture,
(vii) passing the de-watered hydrogen-enriched gas mixture to one or more stages of $CO_2$ separation in pressure-swing absorption apparatus, to generate a pure hydrogen stream and a purge gas stream, and
(viii) recycling at least a portion of the purge gas stream as fuel to the fired steam reformer or to the hydrocarbon feed or purified hydrocarbon feed streams.

BRIEF DESCRIPTION OF THE DRAWINGS

The invention may also be further illustrated by reference to the Figures in which.

DETAILED DESCRIPTION OF THE INVENTION

Figure 1:
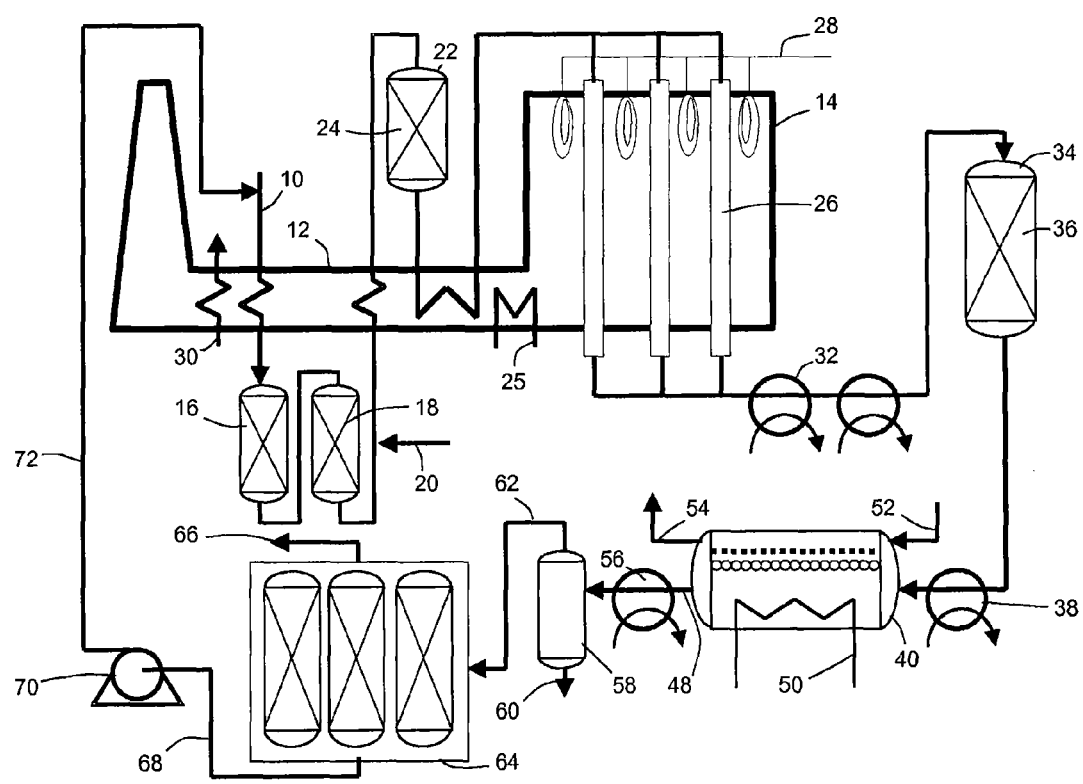
FIG. 1 is a flow sheet depicting a first embodiment of the present invention in which a fired steam reformer is used.

The hydrocarbon source may be natural gas or another methane-containing gas stream such as associated gas, or may be naphtha or other suitable hydrocarbon feed. Refineries often have the option to use other hydrocarbon streams and these tend to be either off-gases, or much heavier streams such as LPG or light naphthas. Natural gas, hydrocarbon gas mixtures containing >90% vol methane and naphtha are preferred feeds. The hydrocarbon feedstock is preferably compressed to a pressure in the range 20-100 bar abs.

The hydrocarbon feed may contain sulphur compounds such as hydrogen sulphide, COS, $CS_2$ and mertcaptans, and these are desirably removed by passing the hydrocarbon through a bed of a particulate sulphur sorbent such as ZnO and promoted ZnO materials, preferably at temperatures above 200° C., more preferably above 350° C. Hydrodesulphurisation catalysts such as Co/Mo, Ni/Mo on alumina may also be used upstream of the sulphur sorbent at temperatures in the range 200-400° C., preferably 350-400° C., to convert organosulphur compounds to $H_2S$ using hydrogen present in, or added to, the hydrocarbon feed. The hydrocarbon feedstocks may also contain chloride compounds such as HCl and these are desirably removed upstream of the sulphur sorbent by passing the hydrocarbon through a bed of a particulate activated alumina sorbent. The hydrocarbon feed may also contain heavy metals, such as mercury and arsenic, and these may be removed by passing the hydrocarbon, at temperatures preferably below 100° C., through a bed of particulate metal-sulphide, e.g. CuS, or a sulphided Cu/ZnO material. Mercury removal, if required is preferably accomplished upstream of sulphur and chloride removal.

The purified hydrocarbon is then mixed with steam: this steam introduction may be effected by direct injection of steam and/or by saturation of the feedstock by contact of the latter with a stream of heated water. In traditional plants, the steam ratio is typically about 3, e.g. between 2.7 and 3.1. In the present invention, the steam ratios may be lowered e.g. to about 2, e.g. 1.8-2.5, preferably 1.8-2.0. By the term "steam ratio" we mean the ratio of the number of moles of steam to the number of gram atoms of hydrocarbon carbon in the feed: thus a methane/steam mixture comprising 2 moles of steam per mole of methane has a steam ratio of 2. This has advantages in respect of providing lower operating costs, for example in steam generation.

The hydrocarbon steam mixture is then fed to the inlet of a pre-reformer in which it is subjected to a step of adiabatic low temperature reforming. In such a process, the hydrocarbon/steam mixture is heated, typically to a temperature in the range 400-650° C., and then passed adiabatically through a bed of a suitable catalyst, usually a catalyst having a high nickel content, for example above 40% by weight. During such an adiabatic low temperature reforming step, any hydrocarbons higher than methane react with steam to give a mixture of methane, carbon oxides and hydrogen. The use of such an adiabatic reforming step, commonly termed pre-reforming, is desirable to ensure that the feed to the steam reformer contains no hydrocarbons higher than methane and also contains a significant amount of hydrogen. This is desirable in order to minimise the risk of carbon formation on the catalyst in the steam reformer.

The pre-reformed gas mixture is then subjected to steam reforming by passing the gas mixture through a plurality of externally-heated catalyst filled tubes in a fired steam reformer to generate a crude synthesis gas mixture comprising hydrogen, carbon monoxide, carbon dioxide and steam.

The fired steam reformer may be a conventional fired steam reformer in which the reformer tubes are arranged vertically and are heated by a combusting fuel. Alternatively a combination of fired and gas-heated reformers may be used. In one type of gas-heated reformer (GHR), the catalyst is disposed in tubes extending between a pair of tube sheets through a heat exchange zone. Reactants are fed to a zone above the upper tube sheet and pass through the tubes and into a zone beneath the lower tube sheet. The heating medium is passed through the zone between the two tube sheets. Gas-heated reformers of this type are described in GB 1 578270 and WO 97/05 947. Another type of gas-heated reformer that may be used is a double-tube heat exchange reformer as described in U.S. Pat. No. 4,910,228 wherein the reformer tubes each comprise an outer tube having a closed end and an inner tube disposed concentrically within the outer tube and communicating with the annular space between the inner and outer tubes at the closed end of the outer tube with the steam reforming catalyst disposed in said annular space. The external surface of the outer tubes is heated. The mixture of hydrocarbon feedstock and steam is fed to the end of the outer tubes remote from said closed end so that the mixture passes through said annular space and undergoes steam reforming and then passes through the inner tube.

In the present invention, a combination of fired reformer and gas-heated reformer is preferred, wherein the pre-reformed gas mixture is split and a first portion fed to a fired steam reformer and a second portion fed to a gas heated reformer, wherein the gas-heated reformer is heated by the crude synthesis gas collected from the tubes of the fired reformer and the product crude synthesis gas recovered both from the tubes and shell side of the gas heated reformer. The percentage volume of pre-reformed gas fed to the fired and gas-heated reformers may be varied in the range 10:90 to 90:10, however preferably ≤50% vol of the feedstock is passed to the GHR, more preferably ≤40% vol.

The steam reforming catalyst used in the fired reformer and/or gas-heated reformer is typically 10-30% wt nickel supported on a refractory support such as calcium aluminate cement, alumina, titania, magnesia, zirconia and the like. Alkali (e.g. potash)-promoted catalysts are desirable where there is a risk of carbon formation. The catalyst is typically supplied as supported NiO, which is reduced in-situ prior to operation. Alternatively, particularly when a low steam ratio is employed, a precious metal catalyst may be used. Suitable precious metal catalysts include rhodium, ruthenium and platinum between 0.01 and 2% by weight on a suitable refractory support such as those used for nickel catalysts. Alternatively a combination of a nickel and precious metal catalyst may be used. For example, a portion of the nickel catalyst may be replaced with a precious metal catalyst, such as a ruthenium-based catalyst. The steam reforming catalyst is normally in the form of shaped units, e.g. cylinders, rings, saddles, and cylinders having a plurality of through holes. Preferably the catalyst is in the form of lobed or fluted cylinders having a passage, or preferably more than one passage, extending longitudinally there-through, as this has been found to offer high catalyst activity combined with low pressure drop through the tubes.

During the reforming process, methane reacts with steam to produce hydrogen and carbon oxides. Any hydrocarbons containing two or more carbon atoms that are present are converted to methane, carbon monoxide and hydrogen, and in addition, the reversible water-gas shift reactions occur.

Steam reforming reactions take place in the tubes over the steam reforming catalyst at temperatures above 350° C. and typically the process fluid exiting the tubes is at a temperature in the range 650-950° C. The heat exchange medium flowing around the outside of the tubes may have a temperature in the range 900-1300° C.

The crude synthesis gas mixture is passed through one or more beds of water-gas shift catalyst in one or more shift vessels to generate a shifted synthesis gas mixture. The crude synthesis gas from the steam reformer is desirably first cooled, e.g. by steam raising, to a temperature suitable for passing over the water gas shift catalyst. Traditional processes employ a shift catalyst based on an iron oxide ($Fe_2O_3$ with added $Cr_2O_3$), which for optimum activity is partly reduced "in-situ" to the $Fe_3O_4$ oxide state. Due to the large concentration of hydrogen entering the shift catalyst reactor (60-70% vol, dry), a large concentration of steam is needed to prevent the further reduction of the $Fe_3O_4$ to FeO or Fe. These lower oxidation states have little water gas shift activity and will result in permanent loss of activity when re-oxidised.

Moreover, with the loss of crystal morphology, the catalyst itself could be virtually destroyed with time. Fe is a known Fischer Tropsch catalyst and could under certain conditions convert the synthesis gas stream into light hydrocarbons—reversing the original intention of the steam reforming operation. Though the amount of steam can be slightly reduced if the iron-based catalyst is promoted with a low level of copper (say around 1-3% by weight in the catalyst), iron based shift catalyst will tend to over-reduce if the S/C ratio at reformer inlet goes below 2.6-2.7 for copper promoted, or 2.85-3.0 for non-copper promoted, catalyst. A solution to the over-reduction problem is to use a copper-based catalyst. Copper-based catalysts (more suitably, Copper/Zinc/Alumina catalysts) are sometimes employed downstream of an iron based catalyst. The iron based catalyst is operated relatively hot (say inlet of 310 to 360° C.) and hence are termed "High Temperature Shift (HTS)" while the less thermally stable copper-based catalyst operates at a lower temperature (say 200 to 220° C. inlet temperature) and hence are termed "Low Temperature Shift (LTS)".

In the present invention, the S/C ratio may require lowering below the levels needed for efficient HTS catalyst, and in this case, it is desirable to install a copper-based catalyst. Suitable stable copper-based catalysts which can operate in the mid temperature range of the HTS versus LTS conditions, often termed "Medium Temperature Shift" (MTS) catalysts are preferred. Such catalysts may be used as a fixed bed adiabatically like HTS or LTS catalysts, or they may be cooled and operated isothermally in so-called "Isothermal Temperature Shift" (ITS) to significantly reduce the otherwise adiabatic temperature rise (typically 80 degrees C.). The MTS inlet temperatures are mid-way between HTS and LTS, in the temperature range 240-280° C.

The shifted synthesis gas, which is partially enriched in hydrogen and carbon dioxide and is depleted in steam and carbon monoxide, is then cooled further and passed to a membrane shift reactor containing a bed of water-gas shift catalyst and a $CO_2$-selective membrane, in which the shifted synthesis gas mixture is subjected to the water-gas shift reaction over the water-gas shift catalyst, and carbon dioxide is separated from the gas mixture by the membrane, thereby generating a hydrogen-enriched synthesis gas.

$CO_2$-selective membranes are commercially available. The shifted gas stream should be cooled, if necessary, to the membrane operating temperature to avoid damaging it, preferably to at least 5 degrees celcius below the membrane operating temperature. Polymer membranes with temperature limit of 165° C., a pressure limit of 10 bara, a $CO_2$ permeance of $8 \times 10^{-5}$ to $1 \times 10^{-4}$ mol/m²s kPa, and a $CO_2/H_2$ selectivity of 120-160 are known. Hence in this case, the temperature to which the shifted gas mixture should be cooled for such polymer membranes is preferably ≤160° C. By the inclusion of the catalyst in the vessel, as $CO_2$ is being removed by the membrane the equilibrium condition changes to allow further CO to be converted to $CO_2$, which in turn is removed and so the equilibrium moves in favour of further CO conversion again. The kinetic limitations of a copper-based catalyst at 160° C. makes the use of alternative water-gas shift catalysts at this temperature, such as precious metal (Pt, Pd, Au, Re, Ru, Rh) water gas shift catalysts, or mixtures thereof desirable.

Known selective membrane shift converter configurations rely on hydrogen-permeable Pd membranes, as opposed to $CO_2$-permeable polymer membranes. For example, a plate type high-temperature shift converter with a shift reaction chamber filled with a high-temperature shift catalyst, a cooling chamber with a filler for promoting heat transfer and into which a cooling gas is introduced and a partition for separating the shift reaction chamber and the cooling chamber are shown in U.S. Pat. No. 6,033,634. The shift reaction chamber has a hydrogen gas chamber separated by a plate type partition composed of a porous plate and a hydrogen permeable palladium film. Thus, only hydrogen generated in the shift reaction chamber permeates the hydrogen permeable film into the hydrogen gas chamber. An alternative configuration for a $H_2$-selective selective membrane shift reactor is given in US 2008/0311014 and yet another in US 2006/0230680. These configurations seek to extract hydrogen rather than $CO_2$ from the process gas. In the present invention, the synthesis gas from steam reforming has already been shifted to increase the hydrogen content and therefore the efficiency of the process overall requires that $CO_2$ be selectively removed from the shifted gas to provide the hydrogen enriched synthesis gas.

Thus the invention includes a $CO_2$-selective membrane shift reactor comprising a shell containing a water gas shift catalyst layer and $CO_2$-selective membrane disposed adjacent said catalyst layer, said catalyst and membrane together dividing the reactor into a process stream side and a permeate side, with said catalyst layer on the process stream side and said membrane on the permeate side. The reactor further comprises a process gas (shifted gas mixture) inlet and process gas (hydrogen-enriched synthesis gas) outlet on said process gas side and a sweep gas inlet and permeate ($CO_2$)/sweep gas outlet on said permeate side.

The selective membrane shift reactor may require a modest amount of cooling to prevent the temperature rise associated with the exothermic water-gas shift reaction damaging the $CO_2$-selective membrane. Such cooling is preferably disposed in the process gas side of the reactor. Where the reactor is installed downstream of a medium temperature (or isothermal) shift bed, the temperature rise (equivalent to <40° C.) is relatively straightforward to control using low pressure stream as a source of boiler feed water pre-heating.

The $CO_2$ that is separated from the process stream is mostly taken away by the depressurisation, but a "sweeping stream" is desirable to assist with this and help maintain the targeted high selectivity. Low-pressure steam is particularly preferred as a sweeping gas as it is relatively easy to separate from the $CO_2$ further downstream. Ideally, the catalyst should be located as close to the membrane as possible as this will assist with the selectivity of the membrane and full equilibrium conversion of the CO.

The hydrogen-enriched gas mixture recovered from the $CO_2$-selective membrane shift reactor contains steam and this needs to be removed before final $CO_2$ separation in the pressure swing absorption (PSA) apparatus. Therefore the hydrogen-enriched gas mixture is cooled, e.g. in heat exchange with water, to below the dew point to condense the steam. The condensate may then be separated off using conventional separation techniques to generate a de-watered hydrogen-enriched gas mixture.

The de-watered hydrogen-enriched gas mixture may then be passed to one or more stages of $CO_2$ separation in pressure-swing absorption apparatus, to generate a pure hydrogen stream and a purge gas stream. Conventional PSA apparatus may be used.

In the present invention, at least a portion of the purge gas stream is recycled as fuel to the fired steam reformer or is recycled to the hydrocarbon feed or purified hydrocarbon feed streams. If desired the purge stream may be divided and at least a portion supplied to two or more of these streams. The purge gas from the PSA is now rich in methane (approximately 92%), with some hydrogen (approximately 7 vol %)

and the carbon oxides (concentrated up to approximately only 1 vol %). This feed can be returned as fuel to the steam reformer if desired, but it is also possible, and it may be preferable, to re-compress the gas and return to the front-end of the plant as feed. By doing so, then up to 100% of the original hydrocarbon feed can be converted to hydrogen, assuming an alternative source of reformer fuel is used. Refineries have fuel gases of lower cost ($ per GJ) that could readily be used as total fuel for the steam reformer. These fuel gases do not make good sources of hydrogen for the hydrogen plant, but are more than adequate for stable combustion. Thus the more valuable hydrocarbon feedstock may be preserved to make the valuable hydrogen whereas in a conventional plant, some 10% would have been returned as fuel. Also, conventionally the hydrogen in the purge fuel is also burnt in the steam reformer.

Most conventional hydrogen plants recycle a small amount of product hydrogen to carryout the feed purification stages of the hydrogen plant as well as aiding the steam reforming conditions and hence carbon lay-down prevention. In the scenario of recycling the purge gas as feed when a membrane shift reactor is installed, there is sufficient hydrogen present to avoid any additional product hydrogen being recycled. So in effect, not only does up to 100% of the hydrocarbon make hydrogen, but also 100% of the hydrogen will end up in the product stream.

In FIG. 1, a hydrocarbon feed steam 10, containing some hydrogen, is heated in a flue-gas duct 12 of a fired steam reformer 14 and passed to purification vessels 16, 18 containing a bed of particulate activated alumina chloride absorbent in vessel 16, and a Co/Mo/Al$_2$O$_3$ hydrodesulphurisation catalyst and a ZnO sulphur sorbent in vessel 18. The purified hydrocarbon stream is mixed with steam from line 20, the mixture heated in flue duct 12, and passed to pre-reformer 22 where it reacts adiabatically over a bed of particulate Ni steam pre-reforming catalyst 24 to generate a pre-reformed gas mixture. Steam raising may be performed by heating water in heat exchange coils 25 also in the duct 12. The pre-reformed gas mixture is heated further in duct 12 and passed to a plurality of externally heated tubes 26 containing a particulate Ni steam-reforming catalyst. The tubes are heated by combustion of a reformer fuel 28 with air 30, which also has been preheated in duct 12. The configuration shown is a top-fired steam reformer, but other configurations may also be used. The pre-reformed gas mixture is converted into a crude synthesis gas containing hydrogen, carbon monoxide, carbon dioxide and steam as it passes through the reformer tubes 26. The crude synthesis gas is collected from the tubes 26 and cooled using one or more heat exchangers 32 (e.g. boilers) using normal heat recovery practice and then fed at an inlet temperature in the range 240-280° C. to a shift vessel 34 containing a bed of particulate stabilised Cu-based MTS catalyst 36, where the water-gas shift reaction occurs, thereby enriching the gas mixture in hydrogen and carbon dioxide and depleting the steam and carbon monoxide levels. The resulting shifted gas mixture is cooled further to about 160° C. by heat exchanger 38 and fed to a CO2-selective membrane shift reactor 40 (see FIG. 3).

The CO$_2$-selective membrane shift reactor 40 contains a layer of copper or precious metal water gas shift catalyst 42 disposed beneath a CO$_2$-selective polymer membrane 44. The catalyst and polymer membrane layers divide the vessel 40 into catalyst side (beneath the catalyst) and a membrane (or permeate) side (above the membrane). The reactor is fed with the cooled shifted gas mixture via line 46 on the catalyst side of the reactor and a hydrogen-enriched process gas is recovered, also from the catalyst side of the vessel by a line 48. The CO content of the hydrogen-enriched stream 48 is 6 ppmv (dry) and the CO$_2$ level is 0.3% vol (dry). Cooling coils 50 are provided within the vessel also on the catalyst side to maintain the temperature at about 160° C. or below. A low-pressure steam sweep gas is provided to the vessel on the permeate side by means of line 52, and a steam/CO$_2$ recovery line 54 is also provided on the permeate side.

Returning to FIG. 1, the hydrogen-enriched stream is fed via line 48 to heat exchanger 56 where it is cooled to below the dew point, causing the steam to condense into water. The resulting mixture is passed to a separator 58 where water is separated from the gases. The condensate is recovered via line 60 and may be used to generate steam for the reforming stages. The resulting de-watered hydrogen-enriched stream from the separator 58 is fed via lines 62 to pressure swing absorption apparatus 64 in which hydrogen is separated by absorption of CO2 from the de-watered hydrogen-enriched gas mixture. The product hydrogen at 99.999% purity is recovered from the PSA apparatus via line 66.

The purge stream 68 recovered from the PSA apparatus is compressed in compressor 70 and fed via line 72 to the hydrocarbon feed line 10.

Figure 2:
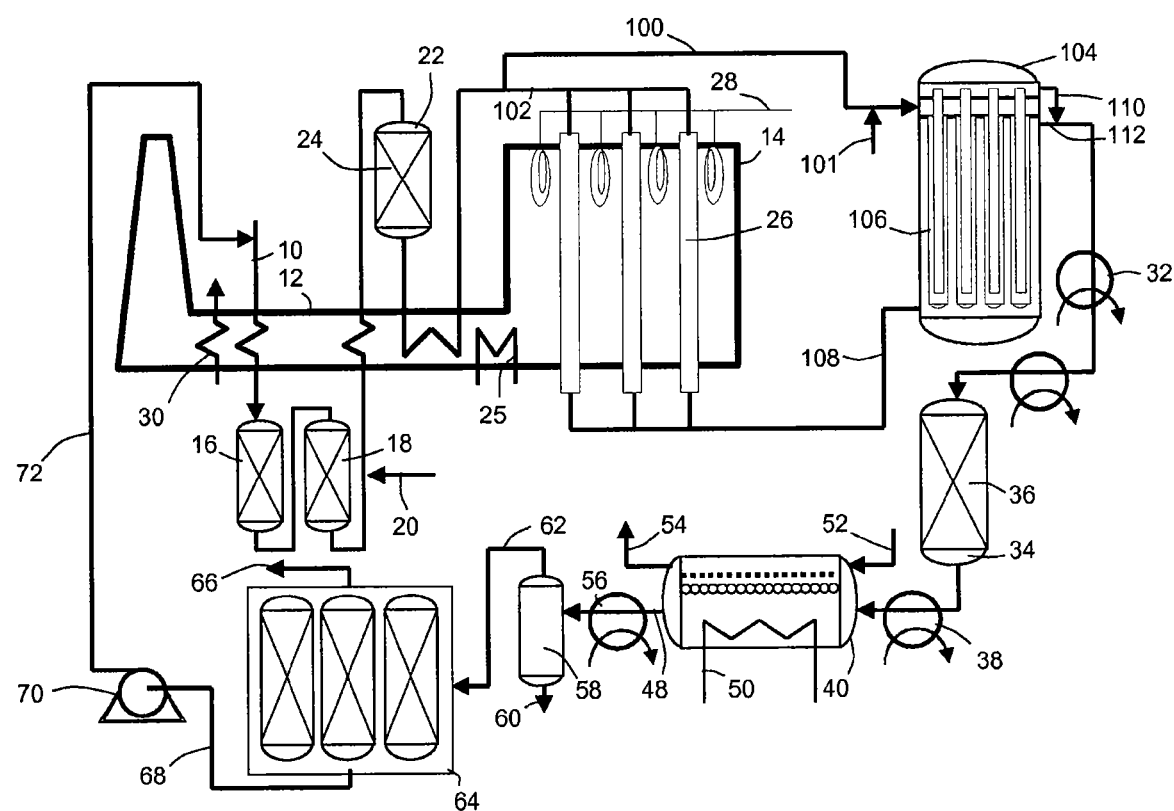
FIG. 2 is a flow sheet depicting a second embodiment of the present invention in which a fired steam reformer is used in conjunction with a gas heated reformer.

In FIG. 2, a hydrocarbon feed steam 10, containing some hydrogen, is heated in a flue-gas duct 12 of a fired steam reformer 14 and passed to purification vessels 16, 18 containing a bed of particulate activated alumina chloride absorbent, a Co/Mo/Al$_2$O$_3$ hydrodesulphurisation catalyst and a ZnO sulphur sorbent. The purified hydrocarbon stream is mixed with steam from line 20, the mixture heated in flue duct 12, and passed to pre-reformer 22 where it reacts adiabatically over a bed of particulate Ni steam pre-reforming catalyst 24 to generate a pre-reformed gas mixture. Steam raising may be performed by heating water in heat exchange coils 25 also in the duct 12.

The pre-reformed gas mixture is heated further in duct 12 and divided into two streams 100 and 102. Stream 100 (about 30% vol) is mixed with supplementary steam from line 101 and passed to the tube side of a bayonet-type gas-heated reformer 104. The tubes 106 in the gas heated reformer contain a particulate Ni steam-reforming catalyst similar to that in tubes 26 in the fired steam reformer 14.

Stream 102 (about 70% vol) is passed to a plurality of externally heated tubes 26 containing a particulate Ni steam-reforming catalyst. The tubes are heated by combustion of a reformer fuel 28 with air 30, which has been preheated in duct 12. The configuration shown is a top-fired steam reformer, but other configurations may also be used. The pre-reformed gas mixture is converted into a crude synthesis gas containing hydrogen, carbon monoxide, carbon dioxide and steam as it passes through the reformer tubes 26.

The crude synthesis gas is collected from the tubes 26 and sent via line 108 to the shell side of the gas-heated reformer 104. The crude synthesis gas heats the pre-reformed gas mixture on the tube side provided by line 100 as it passes through the particulate catalyst, providing a steam reformed gas mixture 110 which is collected and combined with the crude synthesis gas 112 from the shell side of the gas heated reformer 110, thereby generating the crude synthesis gas mixture. The crude synthesis gas mixture in this arrangement may be cooler that that in FIG. 1, however further cooling in one or more heat exchangers 32 is performed to lower the temperature to a temperature in the range 240-280° C. and the resulting cooled crude synthesis gas stream fed to a shift vessel 34 containing a bed of particulate stabilised Cu-based MTS catalyst 36, where the water-gas shift reaction occurs, thereby enriching the gas mixture in hydrogen and carbon dioxide and depleting the steam and carbon monoxide levels.

Figure 3:
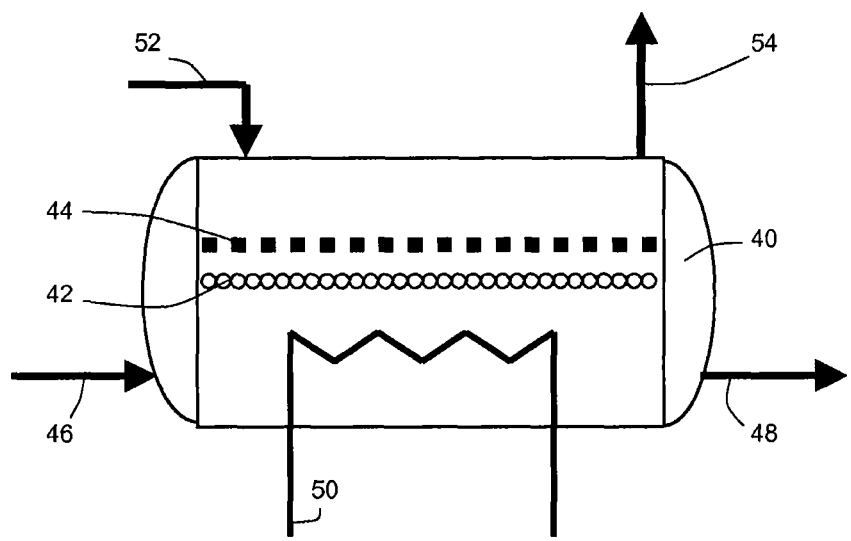
FIG. 3 is a depiction of a $CO_2$-selective membrane shift reactor.

The resulting shifted gas mixture is cooled further to about 160° C. by heat exchanger 38 and fed to a $CO_2$-selective membrane shift reactor 40 (see FIG. 3).

The hydrogen-enriched stream recovered from the shift reactor 40 is fed via line 48 to heat exchanger 56 where it is cooled to below the dew point, causing the steam to condense into water. The resulting mixture is passed to a separator 58 where water is separated from the gases. The condensate is recovered via line 60 and may be used to generate steam for the reforming stages. The resulting de-watered hydrogen-enriched stream from the separator 58 is fed via lines 62 to pressure swing absorption apparatus 64 in which hydrogen is separated by absorption of CO2 from the de-watered hydrogen-enriched gas mixture. The product hydrogen at 99.999% purity is recovered from the PSA apparatus via line 66.

The purge stream 68 recovered from the PSA apparatus is compressed in compressor 70 and fed via line 72 to the hydrocarbon feed line 10.

EXAMPLES

The invention is further illustrated by reference to the following calculated Examples.

Comparative Examples 112,000 Nm3/hr, 99.999% Purity H2 Plant Capacity

The computer simulation work has taken a standard Natural Gas stream with methane at 96 vol % with a "short tail" of heavier hydrocarbons in rapidly decreasing proportions from ethane (2.1 vol %) to pentane (<0.1 vol %). In a first comparative example (base case 1) no pre-reformer was included. In a second comparative example (base case 2) a pre-reformer was included, and MTS was used rather than HTS. The flowsheet comprised conventional fired steam reforming, shift, condensate removal and conventional PSA. The bases for the two cases are defined below.

|  | Base Case 1 | Base Case 2 |
| --- | --- | --- |
| S/C ratio (molar, carbon no.) | 3.0 | 2.0 |
| Pre-reformer | No | Yes |
| HTS | Yes | No |
| MTS | No | Yes |

All the other unit operations/equipment of the plant are assumed to be similar (e.g. the steam reformer & PSA design/operation). For the purpose of this study, the hydrocarbon (NG) consumption (feed and make-up fuel), $CO_2$ produced, steam export, and reformer heat load (equivalent to fuel usage) are compared below.

|  | Base Case 1 | Base Case 2 | Change |
| --- | --- | --- | --- |
| Natural Gas | 1486 GJ/hr | 1552 GJ/hr | +4.4% |
| Feed Fuel (make-up) | 256 GJ/hr | 133 GJ/hr | −48.0% |
| Total | 1742 GJ/hr | 1685 GJ/hr | −3.3% |
| CO2 to atmosphere (in flue gas) | 98 tonnes/hr | 94 tonnes/hr | −4.1% |
| Steam Export | 96 tonnes/hr | 114 tonnes/hr | +15.8% |
| Steam Reformer Heat Load | 219 MW | 202 MW | −7.8% |

The results lead to some interesting conclusions. By installing a pre-reformer and lowering the S/C ratio from 3.0 to 2.0, 3.3% of the total NG consumption is saved and the CO2 emissions are reduced by just over 4%. Despite the reformer heat load being reduced by nearly 8%, it is possible to see the impact of process CO2 being recycled in the purge fuel from the PSA. This contributes some 60% of the CO2 that is in the flue gas, meaning that if the PSA purge gas is burnt in the steam reformer, process efficiency optimisation to the front-end will only have a modest impact to reduce overall CO2 emissions.

Examples

Processes according to the flow sheets in FIG. 1 (Example B) and FIG. 2 (Example C) were compared with base case 2. These examples use a S/C ratio of 2.0, which avoids the process stream operating below the dew point, once the lower temperature membrane shift converter is incorporated into the flow sheet. A further Example A according to FIG. 1 was considered where the purge stream from the PSA, instead of being combined with the hydrocarbon feed, was sent as fuel to the fired reformer akin to the conventional flow sheet. The bases for the comparisons are set out below.

|  | Comparative Case 2 | Example A | Example B | Example C |
| --- | --- | --- | --- | --- |
| S/C ratio (molar, carbon no.) | 2.0 | 2.0 | 2.0 | 2.0 |
| Pre-reformer | Yes | Yes | Yes | Yes |
| Steam Reformer | Fired only | Fired only | Fired only | Fired + GHR |
| HTS | No | No | No | No |
| MTS | Yes | Yes | Yes | Yes |
| Membrane Shift Reactor | No | Yes | Yes | Yes |
| PSA Purge to Fuel | Yes | Yes | No | No |
| PSA Purge to Feed | No | No | Yes | Yes |

The results are summarised below.

|  | Comparative 2 | Example A | Example B | Example C |
|---|---|---|---|---|
| Natural Gas | 1552 GJ/hr | 1468 GJ/hr | 1040 GJ/hr | 1040 GJ/hr |
| Feed Fuel (make-up) | 133 GJ/hr | 127 GJ/hr | 0 GJ/hr | 0 GJ/hr |
| RFG | — | — | 538 GJ/hr | 396 GJ/hr |
| Feed + Feed Fuel + RFG | 1685 GJ/hr | 1595 GJ/hr | 1578 GJ/hr | 1436 GJ/hr |
| $CO_2$ (Fluegas) | 94 tonnes/hr | 37 tonnes/hr | 34 tonnes/hr | 26 tonnes/hr |
| $CO_2$ (Membrane) | — | 52 tonnes/hr | 56 tonnes/hr | 56 tonnes/hr |
| Total $CO_2$ | 94 tonnes/hr | 89 tonnes/hr | 90 tonnes/hr | 82 tonnes/hr |
| Steam Export | 114 tonnes/hr | 68 tonnes/hr | 58 tonnes/hr | 22 tonnes/hr |
| Steam Reformer Heat Load | 202 MW | 169 MW | 159 MW | 120 MW |

There are a number of conclusions that may be drawn here. Most notable is the significant reduction in steam export for Examples A, B & C. Under the proviso that the hydrogen plant is not run as a supplementary steam plant, it is possible to identify the advantages of the membrane shift reactor. By reducing the $CO_2$ in the purge fuel, this significantly reduces the volumetric amount of flue gas which reduces the total available heat in the steam reformer convection section where some of the steam raising as boiler feed water heating is carried-out. For a new plant build, this would reduce the capital investment for the steam raising system. The reduction in steam reformer heat load will have the obvious benefit of smaller size for a new plant. This not only applies to the number of catalyst tubes and radiant box dimensions, but the whole of the convection train and ID/FD combustion air fan size and power requirements. With the total steam reforming system and associated equipment contributing over a third of the plant capital cost, then significant savings are possible.

All hydrocarbon streams are valuable to the refiner. Natural Gas is often imported into the refinery and so the value of this is a significant running cost of the plant (>60%). In the traditional flow sheet, some of the un-converted methane is heated-up, then cooled down, before being recycled as fuel in the purge gas. In addition, some 10% of the hydrogen that is produced by steam reforming of the hydrocarbon feed is also burnt as fuel requiring more feed into the process to make the desired nameplate capacity compared with the membrane shift converter examples A, B & C flow sheets. This all contributes to the reduction in overall feed consumption.

Conventional flow sheets and Example A are constrained to burn the PSA purge gas as there is no recognised alternative usage. However, as noted earlier, in the Example B flow sheet, there is an option to burn the natural gas feed direct as a fuel, or better still, to review the option to utilise refinery fuel gas that may be of lower value ($ per GJ).

The PSA system will also be much reduced in size, as the feed for the Example flow sheets is very lean of both CO and $CO_2$. As with the steam reformer, the impact to lower capital cost will be significant for a new plant build.

It was stated earlier that a problem with a conventional hydrogen plant flow sheet was due to the use of recycle purge gas as fuel where a majority (approx 60%) of the $CO_2$ in flue gas originates from it. Thus any energy efficiency options to the front-end will only play a small part in reducing the carbon footprint for the plant. However, in the present invention, energy efficiency benefits to the steam reforming process step will have a pro-rata benefit on $CO_2$ reduction.

In Example C, the Gas Heated Reformer (GHR) uses process gas from the steam reformer as a source of heat (FIG. 2). Steam reforming catalyst is placed in the outer annulus of bayonet reforming tubes. Some of the hydrocarbon feed plus process steam is fed through the catalyst then back up through the inner tube. The use of bayonet tube designed enhances the extraction of "waste" heat from the process.

The amount of steam reforming that can take place in the GHR will be limited by the amount of high-grade heat that is available in the process stream from the steam reformer. In Example C the percentage of feed going to the GHR is equivalent to 30% of the total hydrocarbon feed to both the steam reformer and the GHR. The results show that quite significant savings can be made in hydrocarbon feed usage (approx 15%). Despite the cost of a heat exchange reformer, the design (and hence cost) of the steam reformer would be considerably smaller. Even allowing for venting of the $CO_2$ stream from the membrane separation, the total emission has been reduced by nearly 13%. Sequestering the $CO_2$ from the membrane would result in a 72% reduction in $CO_2$ emissions.

The invention claimed is:

1. A process for producing hydrogen comprising the steps of:
   (i) passing a hydrocarbon feed though one or more purification sorbents to generate a purified hydrocarbon stream,
   (ii) combining steam with the purified hydrocarbon and passing the hydrocarbon/steam mixture adiabatically through a bed of steam reforming catalyst disposed in a pre-reformer vessel to generate a pre-reformed gas mixture,
   (iii) passing the pre-reformed gas mixture through externally-heated catalyst filled tubes in a fired steam reformer to generate a crude synthesis gas mixture comprising hydrogen, carbon monoxide, carbon dioxide and steam,
   (iv) passing the crude synthesis gas mixture through one or more beds of water-gas shift catalyst in one or more shift vessels to generate a shifted synthesis gas mixture,
   (v) passing the shifted synthesis gas mixture to a membrane shift reactor containing a bed of water-gas shift catalyst and a $CO_2$-selective membrane, in which the shifted synthesis gas mixture is subjected to the water-gas shift reaction over the water-gas shift catalyst, and carbon dioxide is separated from the resulting shifted gas mixture by the membrane, thereby generating a hydrogen-enriched gas mixture,
   (vi) cooling the hydrogen-enriched gas mixture to below the dew point and separating off the condensate to generate a de-watered hydrogen-enriched gas mixture,
   (vii) passing the de-watered hydrogen-enriched gas mixture to one or more stages of $CO_2$ separation in pressure-swing absorption apparatus, to generate a pure hydrogen stream and a purge gas stream, and (viii) recycling at least a portion of the purge gas stream as fuel to the fired steam reformer or to the hydrocarbon feed or purified hydrocarbon feed streams.

2. A process according to claim 1 wherein the hydrocarbon feed is natural gas or a gas stream containing >90% vol methane or a naphtha.

3. A process according to claim 1 wherein the purification sorbents include a sulphur sorbent or a chloride sorbent.

4. A process according to claim 1 wherein the steam is combined with the purified hydrocarbon by means of a saturator or by direct injection such that the steam ratio is in the range 1.8 to 2.5.

5. A process according to claim 1 wherein the pre-reforming catalyst comprises Ni at >40% wt.

6. A process according to claim 1 wherein the pre-reformed gas mixture is split and a first portion fed to the fired steam reformer and a second portion sent to a gas heated reformer, wherein the gas-heated reformer is heated by the crude synthesis gas collected from the tubes of the fired reformer and the product crude synthesis gas is recovered both from the tubes and shell side of the gas heated reformer.

7. A process according to claim 6 wherein the percentage volume of pre-reformed gas fed to the gas-heated reformer is in the range 10-90%.

8. A process according to claim 1 wherein the reforming catalyst used in the tubes of the steam reformer comprise 10-30% wt nickel supported on a refractory support.

9. A process according to claim 1 wherein the shift stage comprises a high temperature shift stage over an iron catalyst with an inlet temperature in the range 310 to 360° C. and a low temperature shift stage at an inlet temperature in the range 200 to 220° C. over a copper catalyst, or, a medium temperature shift stage at an inlet temperature in the range 240 to 280° C. over a stabilised copper catalyst.

10. A process according to claim 9 wherein the medium temperature shift stage is operated isothermally.

11. A process according to claim 1 wherein shifted gas mixture is cooled to at a temperature ≤160° C. and the $CO_2$-selective membrane reactor comprises a polymer membrane with the following characteristics; a temperature limit of 165° C., a pressure limit of 10 bara, a $CO_2$ permeance of $8 \times 10^{-5}$ to $1 \times 10^{-4}$ mol/m$^2$ s kPa, and a $CO_2/H_2$ selectivity of 120-160.

12. A process according to claim 1 wherein the water-gas shift catalyst in the $CO_2$-selective membrane shift reactor is selected from the group consisting of a copper catalyst, a precious metal catalyst, and a mixture thereof.

13. A process according to claim 1 wherein the selective membrane shift reactor contains cooling means to prevent the temperature rise associated with the exothermic water-gas shift reaction damaging the $CO_2$-selective membrane.

14. A process according to claim 1 wherein the selective membrane shift reactor is provided with low-pressure steam as a sweeping gas.

15. A process according to claim 1 wherein the purge gas stream is recycled to the hydrocarbon feed or purified hydrocarbon feed streams.

16. A process according to claim 1 wherein the purge stream is divided and at least a portion supplied to two or more of the fuel to the fired steam reformer, the hydrocarbon feed and the purified hydrocarbon feed.

17. A process according to claim 7 wherein the percentage volume of pre-reformed gas fed to the gas-heated reformer is ≤50%.

18. A process according to claim 7 wherein the percentage volume of pre-reformed gas fed to the gas-heated reformer is ≤40%.

* * * * *